G. W. KIDD.
Rectifying-Machine.
No. 222,282. Patented Dec. 2, 1879.
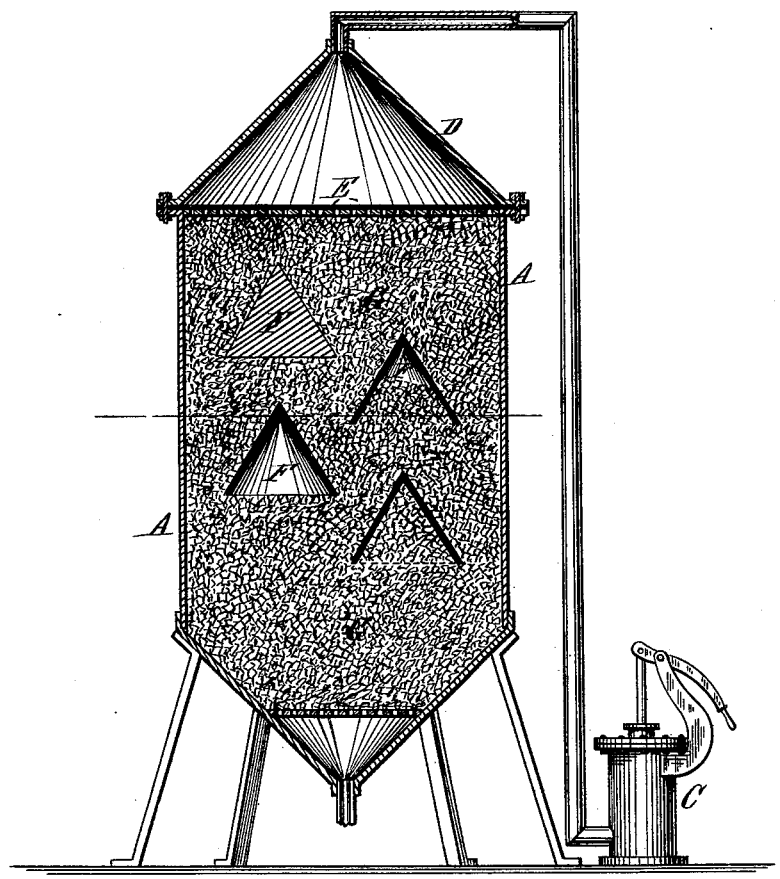
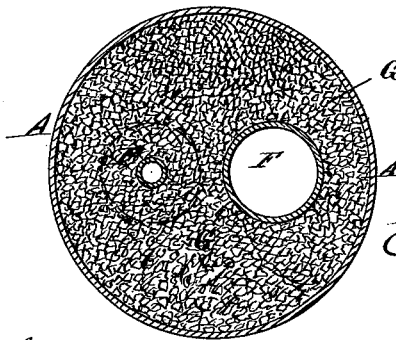

UNITED STATES PATENT OFFICE.

GEORGE W. KIDD, OF NEW YORK, N. Y.

IMPROVEMENT IN RECTIFYING-MACHINES.

Specification forming part of Letters Patent No. 222,282, dated December 2, 1879; application filed May 21, 1879.

*To all whom it may concern:*

Be it known that I, GEORGE W. KIDD, a resident of New York city, in the county and State of New York, have invented a new and useful Improvement in Rectifying-Machines, of which the following is a specification.

This invention relates to contrivances for preventing the formation of direct channels or courses in the charcoal employed in the filtering-tubs by the liquor while being forced through it for filtration, whereby the effect of the filtering material used is materially lessened.

The said invention consists of cone-shaped objects or devices, of metal, wood, or other suitable material, placed within the filtering material in such manner that they press the material laterally in all directions and against the sides of the tub, so as to close up any channels made by the liquor, which is pressed downward through the material from top to bottom by a pump or other suitable means of forcing it.

Figure 1 in the accompanying drawings is a sectional elevation of my improved filtering apparatus. Fig. 2 is a horizontal section of the same.

A represents the tank containing the filtering material G, through which the liquid is to be forced by a pump, C, or other suitable means, said tank being hermetically closed by a cover, D, and having a perforated diaphragm, E, below the cover for distributing the liquid over the charcoal or other filtering material G.

F represents the conical objects or devices, of metal, wood, or other material, which I arrange, as shown, within the charcoal, when it is packed in the tank or in any approved way, with the points either upward or downward, so that as the charcoal settles down by the wash of the liquid they wedge it between each other and against the sides of the tank, so as to effectually close any channels that the liquid may make by washing or pressing down the fine particles.

These cones may be hollow or solid, as preferred, and when hollow may be filled or not with the charcoal, as preferred.

These removable cones are superior to any fixed devices for the same purpose, in that they can be removed for cleaning out the tanks; also, that they can be shifted about in the tub as may seem to be required by any local peculiarities of the same or of the material packed in it, and the cost of fixing or attaching them to the tub is avoided.

These cones are to be removable or not, and attached to the tub or any part thereof, so that they can be shifted about and located sufficiently high, and in close proximity to each other and to the sides of the tub, and as many as preferred may be used, or as found necessary in practice, or be demanded by the different conditions that may arise as to the firmness of the coal used, or the pressure employed, or the breadth and depth of the tub may require.

I have referred to these devices as being conical, but of course they may be pyramidal or any equivalent form.

What I claim is—

One or more loose conical or otherwise pointed devices, F, combined with the rectifying-tank, filtering material, and the pump or other device for forcing the liquid through the filtering material, the said pointed devices being arranged on and within the filtering material when the tank is charged, and in such proximity to the sides of the tank and to each other that they press said material against said sides and each other when it settles down by the wash of the liquid.

GEORGE W. KIDD.

Witnesses:
 JNO. S. KIDD,
 JAS. F. HALLIGAN.